US011613417B2

(12) United States Patent
Moreno Brociner et al.

(10) Patent No.: US 11,613,417 B2
(45) Date of Patent: Mar. 28, 2023

(54) CONTAINER FOR FOODSTUFF STORAGE AND DISPENSING

(71) Applicant: Winpak Ltd., Winnipeg (CA)

(72) Inventors: Manuel Jose Moreno Brociner, Winnipeg (CA); Mustafa Bilgen, Fayettville, GA (US); Olivier Yves Muggli, Winnipeg (CA); Ashley Robert Andrews, Kleefeld (CA)

(73) Assignee: Winpak Ltd., Winnipeg (CA)

( * ) Notice: Subject to any disclaimer, the term of this patent is extended or adjusted under 35 U.S.C. 154(b) by 101 days.

(21) Appl. No.: 17/180,236

(22) Filed: Feb. 19, 2021

(65) Prior Publication Data
US 2022/0267072 A1 Aug. 25, 2022

(51) Int. Cl.
*B65D 35/10* (2006.01)
*B65D 47/12* (2006.01)
(Continued)

(52) U.S. Cl.
CPC ......... *B65D 75/5877* (2013.01); *B65D 35/10* (2013.01); *B65D 47/089* (2013.01);
(Continued)

(58) Field of Classification Search
CPC .... B65D 75/5877; B65D 35/10; B65D 47/12; B65D 47/2031; B65D 75/008; B65D 85/72; B65D 2207/00; B65D 47/089
See application file for complete search history.

(56) References Cited

U.S. PATENT DOCUMENTS 3,342,379 A 9/1967 Foley
4,434,810 A * 3/1984 Atkinson ............... F16K 17/02
137/493
(Continued)

FOREIGN PATENT DOCUMENTS

CA 2205816 A1 12/1997
DE 19953549 A1 5/2001
(Continued)

OTHER PUBLICATIONS

The International Search Report and the Written Opinion of the International Searching Authority, International Application No. PCT/IB2022/051427, pp. 1-10, dated Jun. 29, 2022.

*Primary Examiner* — Frederick C Nicolas
(74) *Attorney, Agent, or Firm* — Bond, Schoeneck & King, PLLC

(57) ABSTRACT

A container and method of manufacture of a container made of a single material is provided. The container includes a base having a base perimeter with a surface, and a wall having an upper edge and a lower edge, the upper edge comprising two upper edge portions, wherein the lower edge is affixed about the entire perimeter surface, and the first upper edge portion is affixed to the second upper edge portion, thereby forming a space to hold foodstuffs. The base stock material is cut and formed into a base with the base perimeter. A seal is applied between the lower edge of the wall and the surface of the base perimeter. Another seal is applied to two vertical end portions of the wall, forming a cup-like container with an internal space. A final seal is applied between two portions of the upper edge of the wall completing the container.

25 Claims, 11 Drawing Sheets

(51) Int. Cl.
*B65D 47/20* (2006.01)
*B65D 75/00* (2006.01)
*B65D 75/58* (2006.01)
*B65D 85/72* (2006.01)
*B65D 47/08* (2006.01)

(52) U.S. Cl.
CPC ......... *B65D 47/12* (2013.01); *B65D 47/2031* (2013.01); *B65D 75/008* (2013.01); *B65D 85/72* (2013.01); *B65D 2207/00* (2013.01)

(56) References Cited

U.S. PATENT DOCUMENTS

| | | | | |
|---|---|---|---|---|
| 4,732,299 | A * | 3/1988 | Hoyt | B29C 66/1122 383/906 |
| 5,307,955 | A | 5/1994 | Viegas | |
| 5,356,039 | A * | 10/1994 | Christine | A47K 5/1215 137/844 |
| 5,667,107 | A * | 9/1997 | Lindsey | B65D 23/003 222/173 |
| 5,950,878 | A * | 9/1999 | Wade | B65D 47/2081 222/207 |
| 6,079,594 | A * | 6/2000 | Brown | B29C 66/112 222/107 |
| 6,622,829 | B2 | 12/2003 | Credle, Jr. | |
| 8,596,501 | B2 * | 12/2013 | Hagleitner | B05B 11/3069 222/207 |
| 8,770,449 | B2 * | 7/2014 | Wellman | B65D 47/2031 222/490 |
| 8,783,515 | B2 * | 7/2014 | Branyon | B65D 35/12 220/678 |
| 8,844,767 | B1 | 9/2014 | Bates et al. | |
| 9,586,740 | B2 * | 3/2017 | James | B65D 75/008 |
| 10,954,039 | B1 * | 3/2021 | Iversen | A23K 10/00 |
| 2010/0072224 | A1 * | 3/2010 | Ha | B65D 47/0842 222/107 |
| 2012/0083398 | A1 | 4/2012 | Berman | |

FOREIGN PATENT DOCUMENTS

| | | |
|---|---|---|
| EP | 0412390 A1 | 2/1991 |
| EP | 1514805 A1 | 3/2005 |
| WO | 2011113539 | 9/2011 |

\* cited by examiner

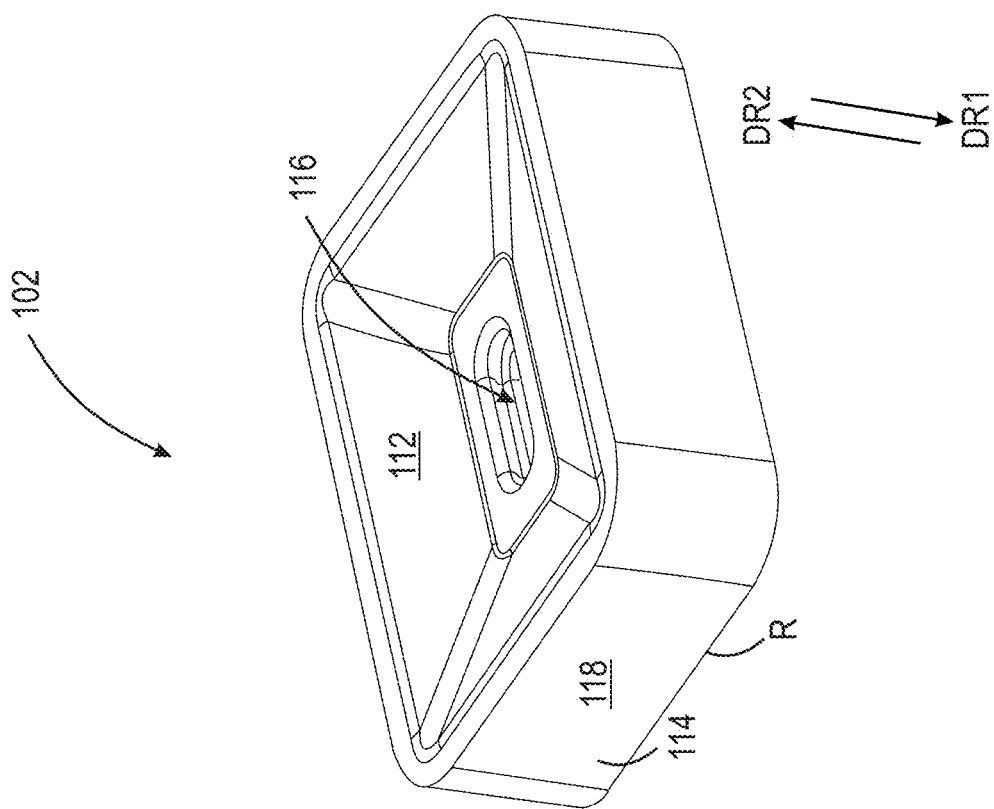
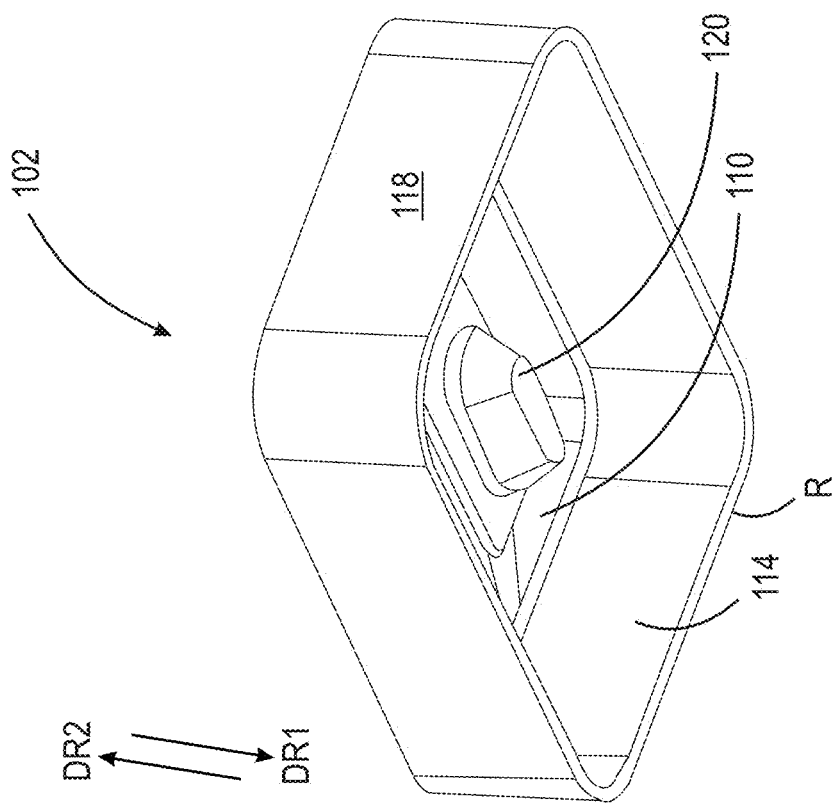

CONTAINER FOR FOODSTUFF STORAGE AND DISPENSING

FIELD OF THE DISCLOSURE

The present disclosure is directed generally to containers used primarily for storing and dispensing solid, liquid, or semi-liquid products such as food, hygiene, or healthcare products. Specifically, the present disclosure is directed to sealable container structures that transition from a storage configuration to a dispensing configuration when a valve is opened by a user.

BACKGROUND

Today's squeeze bottle designs, e.g., bottle designs used for storage and transportation of foodstuffs such as Polyethylene Terephthalate (PET) condiment bottles, etc., go through a single or multi-layer injection pre-forming process, a secondary blow-forming process, a filling process, and a barrier and tamper-evident lid application and assembly of a valve and closure system. Decoration and legal information are typically applied with stick-on or glued labels.

These steps are procedurally cumbersome and are not optimal for minimizing cost of production. These processes typically require relatively heavy gauge and/or dissimilar starting materials, e.g., different plastics or foil. Additionally, process requirements such as injection molding and blow molding only function with a limited selection of material type.

SUMMARY OF THE DISCLOSURE

The present disclosure provides an aesthetically pleasing container design and method of manufacture of a container that can be made of plastic or non-plastic materials and allows for use of less overall material compared to what is used by typical squeeze bottle designs. In addition to easy dispensing of foodstuffs, the present container design does not require an additional label to be applied by the manufacturer of the foodstuff, as the present design provides a large, uninterrupted, surface area for printing of advertisements and/or labels directly to the container's outside surface. The present container design does not require the manufacturer of the food stuff to weld a barrier and tamper-evident closure on the opening of the squeeze bottle and does not require the subsequent assembly of a valve and closure system as these features are built in at the container manufacturing site. The design and method of manufacture provided herein therefore solve the problems of the prior art by providing a container that requires fewer overall materials, uses similar materials for the parts of the container, does not expressly require injection or blow molding, and does not require a separate label application. Thus, the materials and process costs are significantly reduced. The proposed container can be made out of barrier or non-barrier materials to optimize the cost-performance ratio according to the requirement for the shelf-life of the product contained therein. Furthermore, the proposed container can be made out of plastic material that can be recycled. Other examples of the proposed container can be made out of paper in configurations where the paper material would be recyclable.

The container produced by the method includes a base having a base perimeter, the base perimeter having a perimeter surface, and a wall having an upper edge and a lower edge, the upper edge comprising a first upper edge portion and a second upper edge portion, wherein the lower edge of the wall is affixed about the entire perimeter surface of the base, and the first upper edge portion is affixed to the second upper edge portion, thereby forming a space to hold foodstuffs. The method provides cutting the base from stock material and forming it into the base with the base perimeter. A seal is applied between the lower edge of the wall and the surface of the base perimeter. In some examples, another seal (e.g., a lap seal or butt-joint seal) is used to seal together vertical end portions of the wall, forming a cup-like container with a space within it arranged to receive a material. After filling, a final seal is applied between two portions of the upper edge of the wall completely sealing the filled material within the internal space of the container. Additionally, the base perimeter has a lower rim that allows the container to stand vertically where the rim is below a plane separating the content of the container from the aperture in the base.

In one example, a container for storing and dispensing foodstuffs is provided, the container including a base having a an aperture for dispensing the foodstuffs and a base perimeter, the base perimeter having a perimeter surface, and a wall having an upper edge and a lower edge, the upper edge comprising a first upper edge portion and a second upper edge portion, wherein the lower edge of the wall is affixed about the entire perimeter surface of the base, and the first upper edge portion is affixed to the second upper edge portion, thereby forming a space to hold foodstuffs.

In an aspect, the base further includes a lower base surface having an imaginary major axis and an imaginary minor axis, where the imaginary major axis is longer than the imaginary minor axis.

In an aspect, the wall includes a first vertical portion arranged substantially orthogonal to the imaginary major axis and the imaginary minor axis of the base, and a second vertical portion arranged substantially orthogonal to the imaginary major axis and the imaginary minor axis of the base, and wherein the first vertical portion and the second vertical portion of the wall are affixed to each other.

In an aspect, the base comprises a lower base surface, the lower base surface being formed as a circle, a square, a rounded rectangle, a squircle, or a rectellipse.

In an aspect, the base comprises a lower base surface, the lower base surface including an aperture communicably coupled with the space.

In an aspect, the aperture is formed as an integral valve or configured to receive a valve insert.

In an aspect, the base perimeter terminates at a rim, the rim configured to uniformly contact a planar surface to support the container.

In an aspect, the wall and the base are made of paper, polypropylene, polyethylene, polyethylene terephthalate, polyamide, polystyrene, polylactic acid, thermoplastic starch, Polyhydroxyalkanoate, Polyhydroxybutyrate, Polybutylene succinate, or any combination thereof.

In an aspect, wherein a first volume between a lower base surface of the base and a plane coincident with a rim of the base is less than a second volume of the space to hold foodstuffs.

In an aspect, the container further includes a cap assembly, wherein the entire cap assembly is disposed within a first volume between a lower base surface of the base and a plane coincident with a rim of the base.

In an aspect, the wall has a thickness and the thickness is selected from a range between 10-1500 microns.

In an aspect, a method of manufacturing a container is provided, the method including: forming a base, the base having an aperture for dispensing the foodstuffs and a base perimeter, the base perimeter having a perimeter surface; forming a wall having an upper edge and a lower edge, the upper edge comprising a first upper edge portion and a second upper edge portion; sealing the lower edge of the wall about the entire perimeter surface of the base; and sealing the first upper edge portion to the second upper edge portion, thereby forming a space.

In an aspect, the wall is formed with a first vertical portion and a second vertical portion, the method further including sealing the first vertical portion and the second vertical portion.

In an aspect, the lower base surface is formed as a circle, a square, a squircle, or a rectellipse.

In an aspect, the lower base surface comprises an aperture communicably coupled with the space.

In an aspect, the aperture is formed as an integral valve or is configured to receive a valve insert.

In an aspect, wherein a first volume between the lower base surface of the base and a plane coincident with a rim of the base is less than a second volume of the space to hold foodstuffs.

In an aspect, wherein the base is formed with a cap assembly, wherein the entire cap assembly is disposed within a first volume between a lower base surface of the base and a plane coincident with a rim of the base.

In an aspect, the wall and the base are formed of polypropylene, polyethylene, polyethylene terephthalate, polyamide, polystyrene, polylactic acid, paper, thermoplastic starch, Polyhydroxyalkanoate, Polyhydroxybutyrate, Polybutylene succinate, or any combination thereof.

In an aspect, the sealing of the lower edge of the wall about the entire perimeter surface of the base and the sealing of the first upper edge portion to the second upper edge portion use heat sealing, conduction sealing, induction sealing, adhesive sealing, ultrasonic bonding, welding, laser sealing or any combination thereof.

In another example, a method of manufacturing a container is provided, the method including: providing a base sheet stock of a first thickness to act as a base for the container; cutting a base shape from the base sheet stock; forming the base by forming a base perimeter having a perimeter surface; installing a cap assembly or forming a spout on the base; providing a wall sheet stock of a second thickness to act as a wall; cutting a wall shape from the wall sheet stock; attaching and sealing a lower edge of the wall shape about the entire perimeter surface of the base; forming the container having an interior space bounded by the base and the wall that is open at an upper edge, opposite the lower edge, by sealing together a first vertical portion and a second vertical portion of the wall; filling the interior space with a material; and sealing a first upper edge portion with a second upper edge portion of the wall, thereby closing the container.

In another example, a method of manufacturing a container is provided, the method including: providing a base sheet stock of a first thickness to act as a base for the container; cutting a base shape from the base sheet stock; forming the base by forming a base perimeter having a perimeter surface; installing a cap assembly or forming a spout on the base; extruding and cutting a wall in the form of a cylinder; sealing a lower edge of the wall to the perimeter surface of the base forming an interior space; filling the interior space with a material; and sealing a first upper edge portion with a second upper edge portion of the wall, thereby closing the container.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

FIG. 2A is a bottom perspective view of a base according to the present disclosure.

FIG. 2B is a top perspective view of a base according to the present disclosure.

DETAILED DESCRIPTION OF EMBODIMENTS

The present disclosure provides an aesthetically pleasing container design with a maximum billboard surface and method of manufacture of a container that can be made of plastic or non-plastic materials and allows for use of less overall material compared to what is used by typical bottle designs. The container produced by the method includes a base having a base perimeter, the base perimeter having a perimeter surface, and a wall having an upper edge and a lower edge, the upper edge comprising a first upper edge portion and a second upper edge portion, wherein the lower edge of the wall is affixed about the entire perimeter surface of the base, and the first upper edge portion is affixed to the second upper edge portion, thereby forming a space to hold foodstuffs. The method provides cutting the base from stock material and forming it into the base with the base perimeter. A seal is applied between the lower edge of the wall and the surface of the base perimeter. In some examples, another seal (e.g., a lap or butt-joint seal) is used to seal together vertical end portions of the wall, forming a cup-like container with a space within it arranged to receive a material, e.g., foodstuff or other content. After filling, a final seal is applied between two portions of the upper edge of the wall completely sealing the filled material within the internal space of the container.

Figure 1:
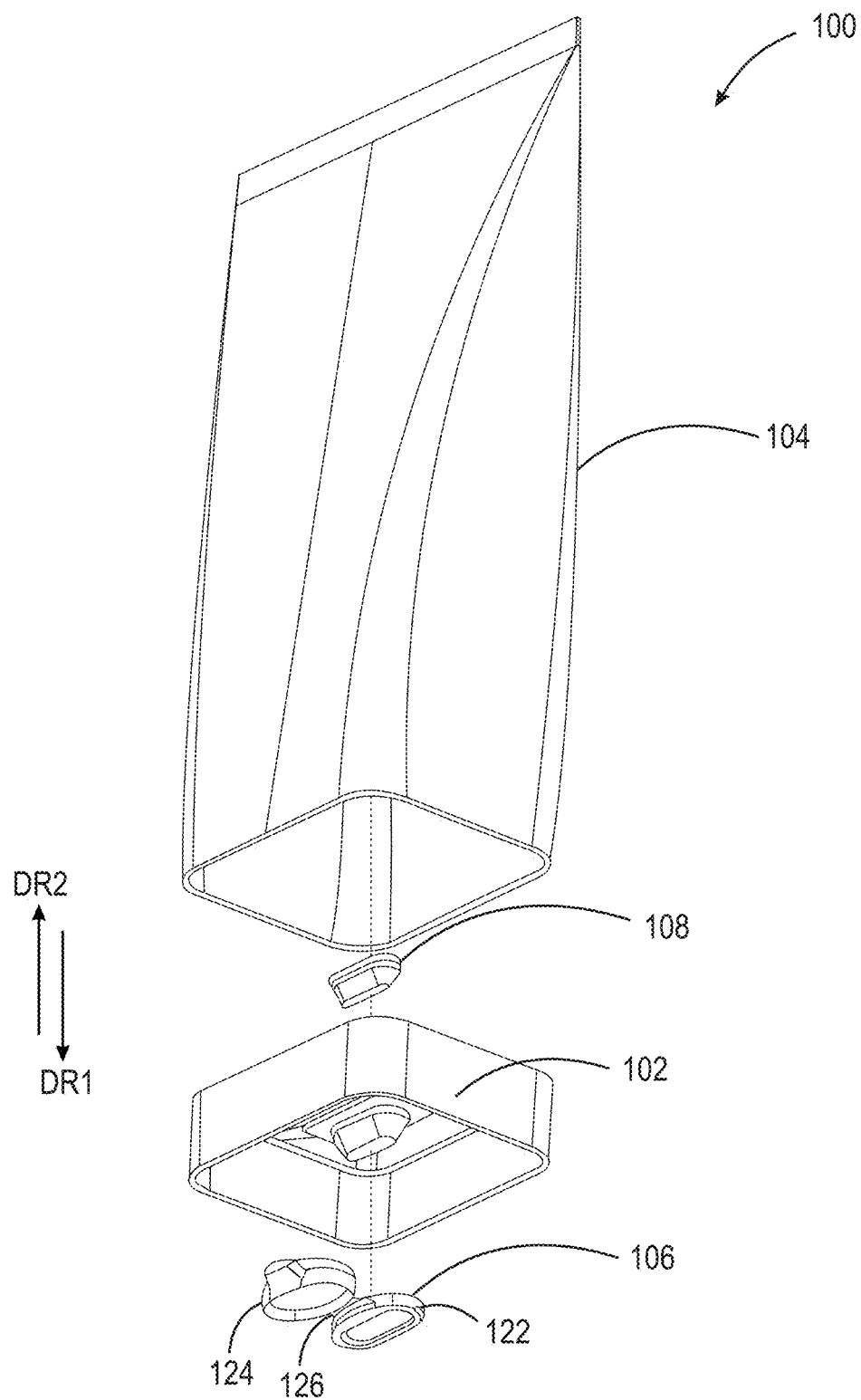
FIG. 1 is a bottom perspective, partially-exploded, view of a container according to the present disclosure.

Transitioning now to the figures, FIG. 1 illustrates a partially-exploded bottom perspective view of container 100 according to the present disclosure. Container 100 is intended to be a container capable of dispensing foodstuffs or other solid, liquid, or semi-liquid materials that are stored in an internal cavity or space 128 (discussed below), when a user or consumer applies pressure or a compressive force to the outside of the container 100. As discussed below in detail, it should be appreciated that, the sealed structure of container 100 allows for the storage and dispensing of solids, liquids and/or semi-fluid materials, liquids with solid parts or foodstuffs including, but not limited to edible condiments such as ketchup, mustard, yogurt, mayonnaise, or any other yield stress fluids.

As shown in FIG. 1, container 100 includes a base 102, a wall 104, and a cap assembly 106. In some examples, as shown in FIG. 1, container 100 also includes a separate valve 108, embodied as a one-way, anti-spill, diaphragm valve to allow foodstuffs to exit space 128 (discussed below) when completely sealed and assembled. However, it should be appreciated that in other examples (not shown), valve 108 is an integrally formed portion of base 102.

Figure 3:
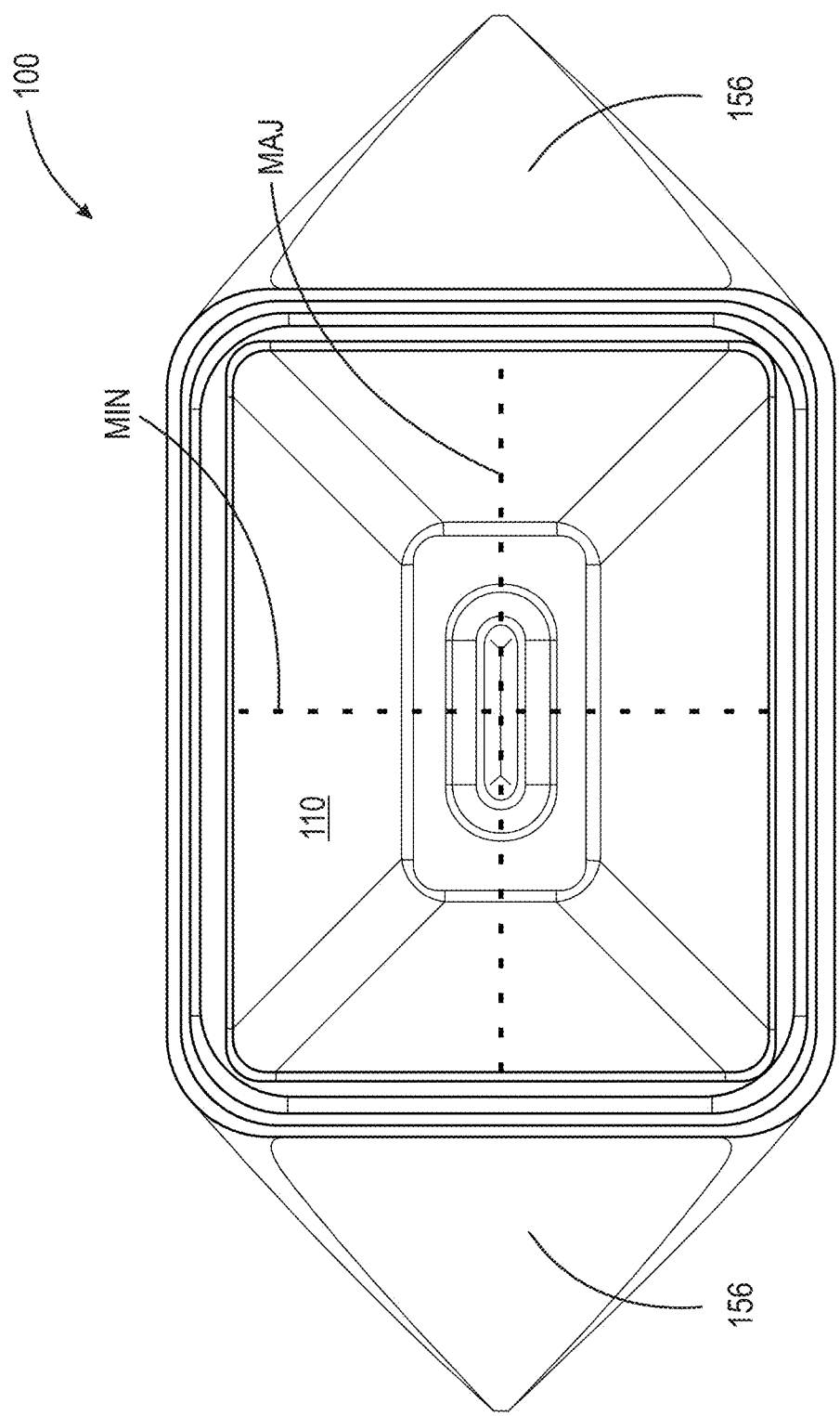
FIG. 3 is a bottom plan view of a container according to the present disclosure.
Figure 4B:
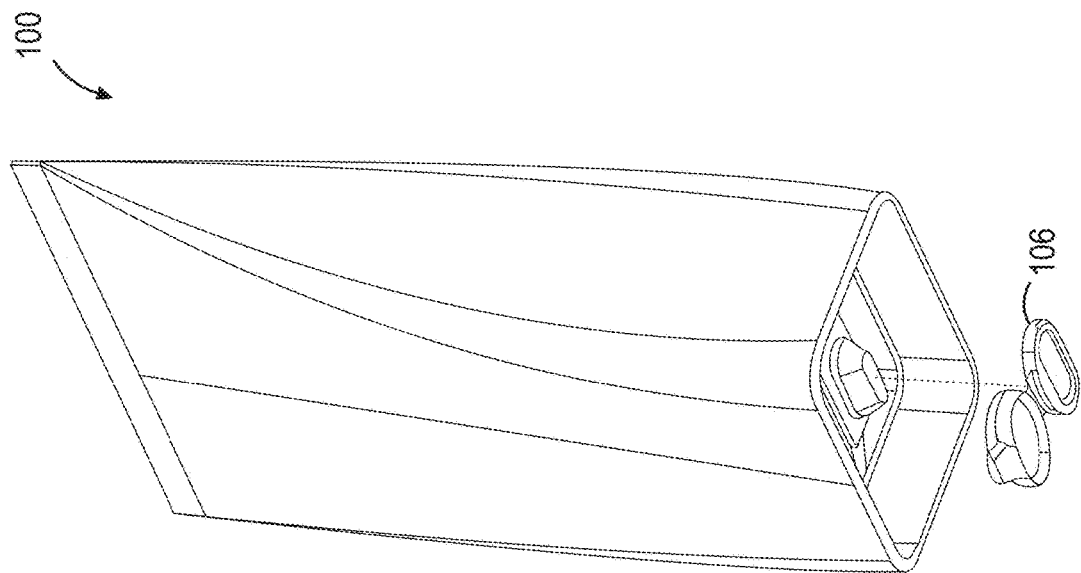
FIG. 4B is a bottom perspective, partially-exploded, view of a container according to the present disclosure.
Figure 4A:
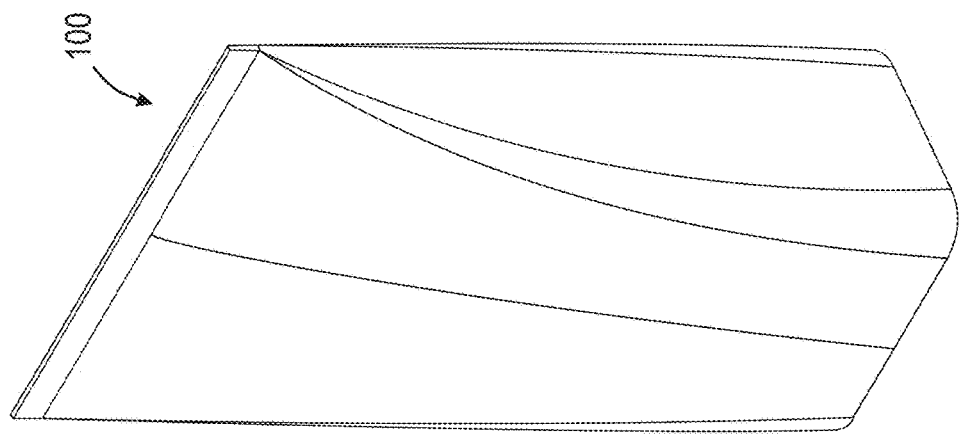
FIG. 4A is a top perspective view of a container according to the present disclosure.

FIGS. 2A-3, illustrate various views of base 102 according to the present disclosure. FIGS. 2A and 2B illustrate a bottom perspective view and top perspective view of base 102, respectively. FIG. 3 illustrates a bottom plan view of container 100 showing a detailed view of base 102. As illustrated in FIGS. 2A-3, base 102 is intended to be a structure or plurality of structures capable of supporting and balancing container 100 when not in use, i.e., when not dispensing foodstuffs or other materials. For example, when not in use, base 102 is intended to support the weight and contents of container 100 by acting as a standing surface on which the rest of container 100 is supported such that no external support is needed, i.e., container 100 can stand on its own. Base 102 is formed through one or more processes e.g., rotation molding, blow molding, injection molding, compression molding, extrusion molding, coining, cold forming and/or thermoforming. Prior to formation, the base stock material can include a new sheet of stock material or unused portions of previously used stock material and can have a first thickness T1 (shown in FIG. 5). In some examples, the molding processes used utilize one or more heated dies. Additionally, base 102 is intended to be made primarily of a single type of material, e.g., primarily of polypropylene, polyethylene, polyethylene terephthalate, polyamide, polystyrene, polylactic acid, paper, thermoplastic starch, Polyhydroxyalkanoate, Polyhydroxybutyrate, Polybutylene succinate, or any combination thereof and may contain an oxygen barrier layer where the oxygen barrier layer is made out of, e.g., Ethylene vinyl alcohol. In one example, base 102 is intended to be formed from a single sheet of stock material, e.g., a single sheet of plastic. In another example, base 102 is intended to be formed from a single sheet of stock material, e.g., a single sheet of paper. It should be appreciated that in the event the material or foodstuffs stored within container 100 are liquid or semi-liquid, the paper stock material can be lacquered, coated, treated or sprayed with a hydrophobic coating, e.g., wax or other plastics such as polyolefin dispersions, such that the paper container is waterproof. The single sheet is cut to an initial shape and then formed into the defined shapes and structures set forth below. It should be appreciated that the single sheet of stock material is intended to be made primarily of one of the foregoing materials, but can include other trace materials, e.g., additives such as antioxidants, color pigment, slip agents, etc. Furthermore, it should be appreciated that base 102 can also contain an oxygen barrier layer comprising Ethylene-Vinyl-Alcohol or Poly-vinyl-Alcohol or a barrier coating such as metals, metal oxides or polymeric cellulose nano crystals. In some examples, base 102 is made of renewable resources such as: paper and other cellulose-based materials; Polylactic acid; Polybutylene succinate; Thermoplastic Starch; Polyhydroxalkanoate; Polyhydroxybutyrate; and combinations thereof.

As illustrated, base 102 includes a lower base surface 110 (shown in FIGS. 2A and 3), an upper base surface 112 (shown in FIG. 2B), a base perimeter 114 (shown in FIGS. 2A and 2B), and a base aperture 116 (shown in FIG. 2B). The lower base surface 110 and upper base surface 112 have an imaginary major axis MAJ and an imaginary minor axis MIN (as shown in FIG. 3). It should be appreciated that these axes are referred to herein as "major axis MAJ" and "minor axis MIN." In one example, as illustrated in FIG. 3, the length of major axis MAJ is greater or longer than the length of minor axis MIN such that lower base surface 110 and upper base surface 112 substantially form a rectangular shape. Although not shown, in another example the length of major axis MAJ and the length of minor axis MIN are equal such that lower base surface 110 and upper base surface 112 substantially form a square shape. Additionally, the outside corners of lower base surface 110 and upper base surface 112 can be filleted or rounded such that the lower base surface, for example, substantially forms a rectellipse (in the case that the major axis MAJ and minor axis MIN are different), or a squircle (in the case that the major axis MAJ and minor axis MIN are equal). Therefore, in some examples, the perimeter of the lower base surface 110, for example, can be defined by the quartic curve $x^4/a^4+y^4/b^4=1$, where ($x=0$, $y=0$) is the origin between the major axis MAJ and minor axis MIN, and where "a" and "b" are shape parameters and "a" can be in the range of 1.5-30 cm and "b" can be in the range of 1-25 cm. Alternatively, the lower base surface 110, for example, can be defined by a different curve having a formula, i.e., $s^2 \cdot (x^2/a^2) \cdot (y^2/b^2) - x^2/a^2 - y^2/b^2 + 1 = 0$, where ($x=0$, $y=0$) is the origin between the major axis MAJ and minor axis MIN; "s" is the squareness parameter that varies between 0 and 1; and where "a" and "b" are shape parameters. In one example, "s" is in the range of 0.6-0.9, "a" can be in the range of 2-12 cm and "b" can be in the range of 1.5-10 cm. It should also be appreciated that, although not illustrated, lower base surface 110, for example, can be substantially circular and can have a radius between 2 and 8 cm. In some examples, the diameter of the circular base shape can be selected from between 2 cm to 30 cm. In some examples where the base is shaped as a rectellipse, the length of the base 102 can be selected from between 2 cm and 30 cm.

Extending downward from the lower base surface 110, i.e., extending in a first direction DR1 with respect to lower base surface 110, base 102 includes a lip or integrally formed base perimeter 114. As illustrated in FIGS. 2A-2B, base perimeter 114 substantially forms an extruded wall that extends in first direction DR1 and encompasses or surrounds lower base surface 110. As base perimeter 114 borders and surrounds lower base surface 110, base perimeter will be formed as substantially the same shape as lower base surface 110 as discussed above. For example, should lower base surface 110 be shaped as a rectellipse or squircle, the outside border of base perimeter 114 will also be shaped as a rectellipse or squircle. Base perimeter 114 includes an outer surface, i.e., a base perimeter surface 118 configured to receive, engage with, and seal to the inner surface 130 of wall 104 (discussed below) to form first seal 146 (also discussed below). Base perimeter 114 extends in first direction DR1 and terminates at a rim R. Rim R (shown in FIGS. 2A-2B) is intended to uniformly contact a surface such as a table top surface or other planar surface such that the base 102 supports container 100 so that container 100 stands vertically, i.e., substantially orthogonally the planar surface on which it stands.

Base 102 further includes an aperture 118 proximate upper base surface 112, and a spout 120 in fluid communication with aperture 118 and located proximate to and extending from lower base surface 110 in first direction DR1. In some examples, aperture 118 is intended to receive valve 108 (discussed above) such that valve 108 can receive liquid or semi-liquid foodstuffs from space 128 (discussed below) and dispense them as desired. In other words, aperture 118 is configured to receive a valve insert that acts as a pressure release diaphragm. Spout 120 is intended to be a protrusion extending from lower base surface 110 of base 102 in first direction DR1, i.e., in substantially the same direction as base perimeter 114. Spout 120 is also intended to receive and direct liquid or semi-liquid foodstuffs supplied from inside the sealed container 100, which will be discussed below in detail. Although not shown, in some examples embodiments, valve 108 is formed as an integral part of spout 120 and/or aperture 118.

As discussed above, and illustrated in FIG. 1, container 100 also includes a cap assembly 106, which includes a cap base portion 122, a cap 124, and a hinge 126 to pivotably connect cap 124 to cap base 122. Cap base 122 includes a aperture or through-bore arranged to fit over and around, or over and about, spout 120, and has an inside surface and rim configured to engage with the outer surface of spout 120 of base 102 via friction fit. It should be appreciated that one or more adhesives or bonding agents can be used in the alternative to or in addition to the friction fit to secure the cap base 122 over an about spout 120. Cap 124 is intended to pivot toward and away from cap base 122 via hinge 126 such that, when in the closed position, cap 124 acts as an additional barrier to foodstuffs leaking out of or being dispensed from container 100.

Figure 5:
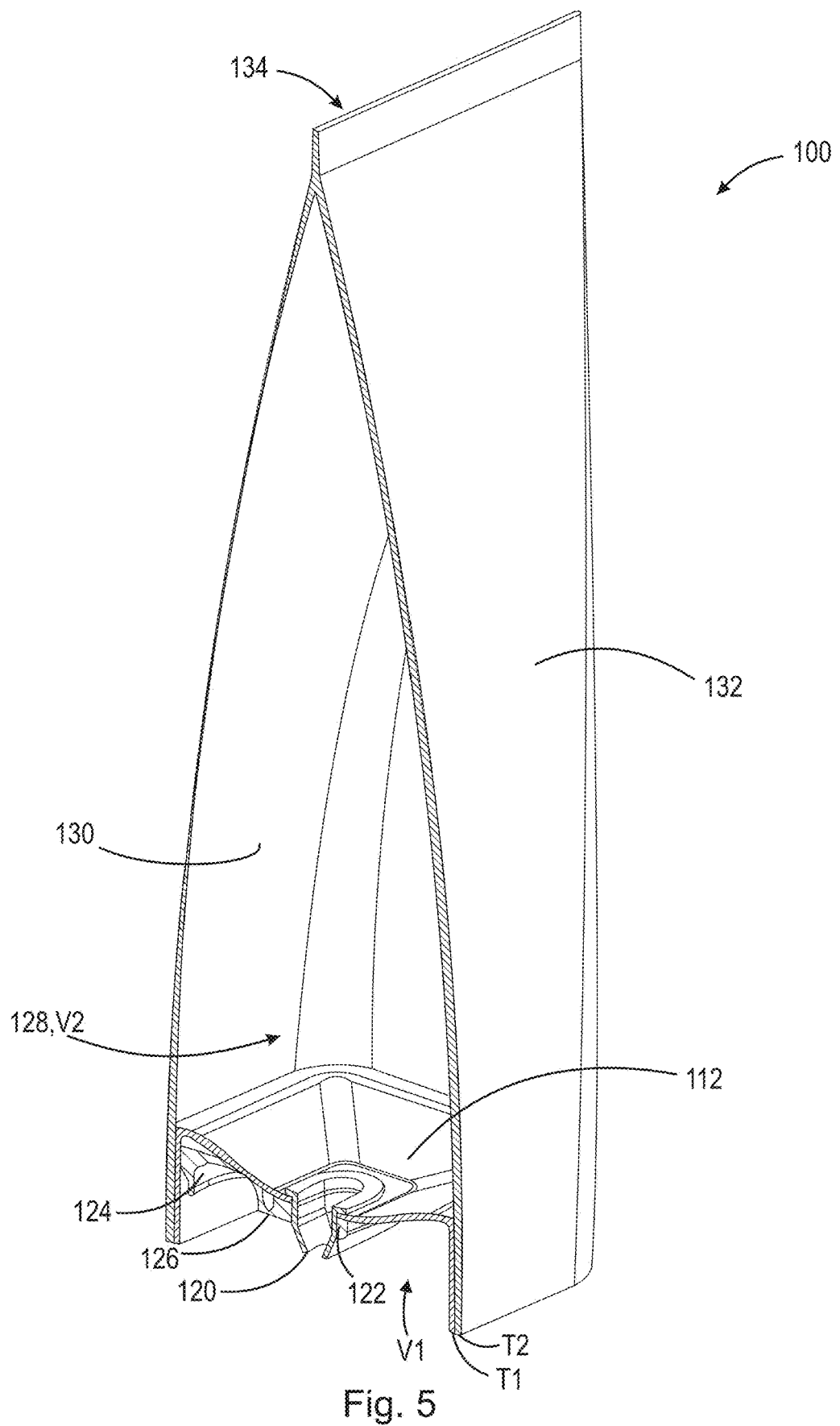
FIG. 5 is a cross-sectional view of a container according to the present disclosure.
Figure 6B:
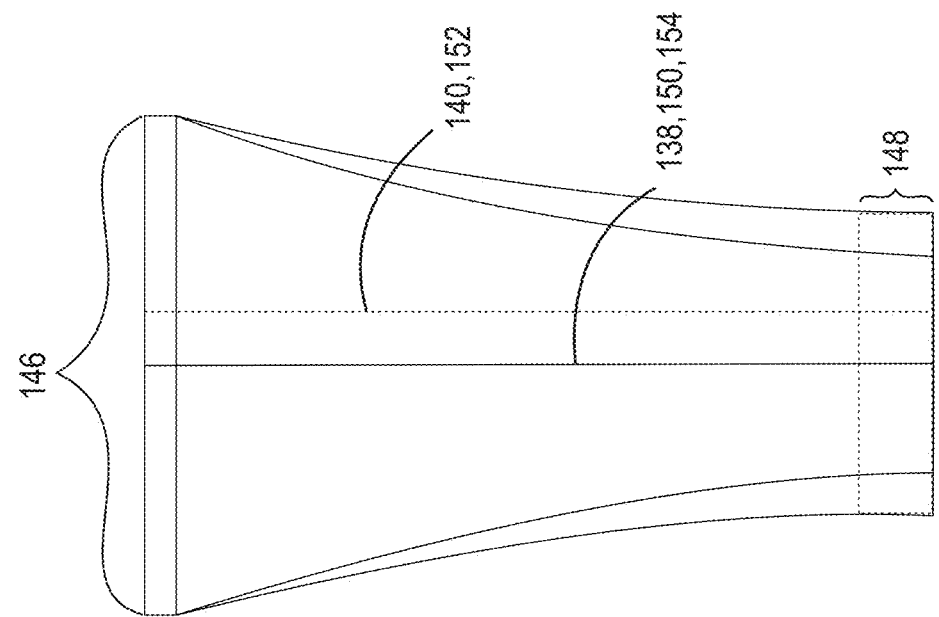
FIG. 6B is a side elevational view of an assembled wall according to the present disclosure.

As illustrated in FIGS. 1, and 3-6B, container 100 also includes a single, unitary, wall 104 configured to seal to itself and wrap around and seal to the perimeter surface 118 of base 102 to form an internal space 128, where internal space 128 is configured to store a product. FIG. 4A illustrates a top perspective view of an assembled container 100, and FIG. 4B illustrates a bottom perspective, partially-exploded, view of container 100 with cap assembly 106 separated from spout 120 for clarity. FIG. 5 illustrates a cross-sectional view of an assembled container 100 where cap assembly 106 is in an open state. FIG. 6A is a side elevational view of a wall 104 in a disassembled state before any portion of container 100 has been sealed. FIG. 6B is a side elevational view of container 100 illustrating the various seals that will be discussed below in detail. As illustrated, wall 104 is a single continuous segment of stock material configured to form a substantial portion of the body of container 100, e.g., the portion of container 100 that is primarily responsible for storing solid, liquid, or semi-liquid foodstuffs. Similarly to the single sheet of stock material used for forming base 102 (discussed above), the single continuous segment of stock material for forming wall 104 can be selected from, e.g., materials made primarily of polypropylene, polyethylene, polyethylene terephthalate, polyamide, polystyrene, polylactic acid, paper thermoplastic starch, Polyhydroxyalkanoate, Polyhydroxybutyrate, Polybutylene succinate, or any combination thereof and may contain an oxygen barrier layer where the oxygen barrier layer is made out of, e.g., Ethylene vinyl alcohol. In one example, wall 104 is intended to be formed from a single sheet of stock material, e.g., a single sheet of plastic. In another example, wall 104 is intended to be formed from a single sheet of stock material, e.g., a single sheet of paper. It should be appreciated that in the event the material or foodstuffs stored within container 100 are liquid or semi-liquid, the paper stock material can be treated or sprayed with a hydrophobic coating, e.g., wax or other plastics such as polyolefin dispersions. The single sheet is cut to an initial shape and formed and/or sealed into the defined shapes and structures set forth below. It should be appreciated that the single sheet of stock material is intended to be made primarily of one of the foregoing materials, but can include other trace materials, e.g., additives such as antioxidants, color pigment, slip agents, etc. Furthermore, it should be appreciated that wall 104 can also contain an oxygen barrier layer comprising Ethylene-Vinyl-Alcohol or Poly-vinyl-Alcohol or a barrier coating such as metals, metal oxides or polymeric cellulose nano crystals. In some examples, wall 104 is made of renewable resources such as: paper and other cellulose-based materials; Polylactic acid; Polybutylene succinate; Thermoplastic Starch; Polyhydroxalkanoate; Polyhydroxybutyrate; and combinations thereof.

Similarly to the base stock material, the wall stock material has a second thickness T2 (shown in FIG. 5). It should be appreciated that the second thickness T2, i.e., thickness of the wall stock material is less than or equal to the first thickness T1, i.e., the thickness of the base stock material. In some examples, the thickness of the wall stock material, i.e., second thickness T2 is selected from the range of 10-1500 microns. In some examples, the thickness of the wall stock material, i.e., second thickness T2 is less than 1500 microns, or is selected from the range of 50-500 microns, from the range of 100-250 microns, or is less than 250 microns. Additionally, as will be discussed below, in one example manufacturing process, the wall stock material can be profile extruded to form a cylindrically shaped pre-formed portion that can be sealed to the base 102 and along a lower upper edge (e.g., lower edge 136 discussed below) to form container 100.

Figure 6A:
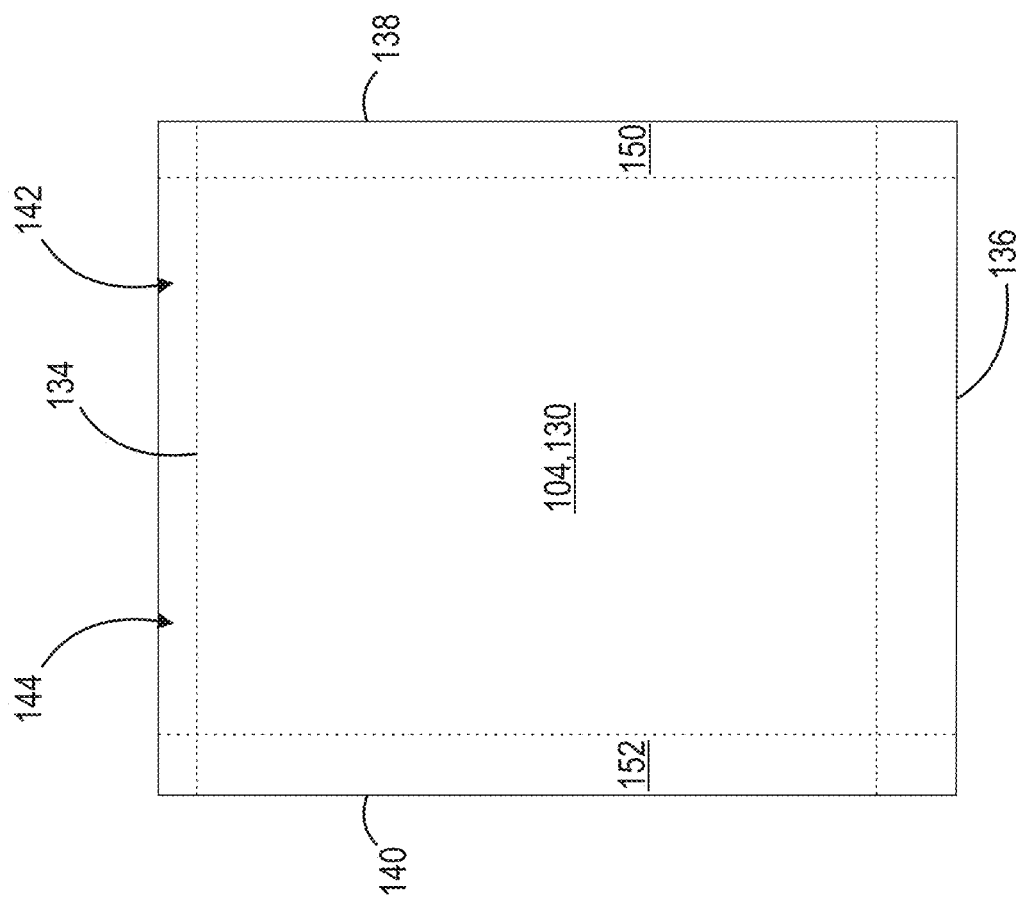
FIG. 6A is a side elevational view of an unassembled wall according to the present disclosure.

As shown in FIGS. 5 and 6A, wall 104 includes an inside surface 130, an outside surface 132, an upper edge 134, a lower edge 136, a first end 138, and a second end 140. Inside surface 130 of wall 104 is the surface configured to face inward, and substantially form the external barrier that defines internal space 128, e.g., where inside surface 130 is configured to contact the stored foodstuff within space 128. The outside surface 132 is the surface diametrically opposed to inside surface 130, such that, when assembled and sealed (discussed below), outside surface 132 faces the user or other outside elements external to container 100. In some examples, outside surface 132 is configured to contact the inside of a user's hand when squeezing or dispensing foodstuffs from container 100. It should be appreciated that wall 104 can take the shape of a substantially rectangular piece of material or may be formed with angular deviations from a rectangle.

The upper edge 134 is conceptually divided into two portions, i.e., a first upper edge portion 142 and a second upper edge portion 144. After wall 104 is cut from a single sheet of stock material, the upper edge 134 is folded together such that the first upper edge portion 142 and the second upper edge 144 are sealed together along the surface area shown above the horizontal dashed lines proximate upper edge 134 in FIG. 6A, forming the first seal 146 (which substantially acts as the top of container 100 and the upper boundary for internal space 128). These two portions can be sealed together using one or more sealing techniques, e.g., heat sealing, conduction sealing, induction sealing, adhesive sealing, ultrasonic bonding, welding, laser sealing or any combination thereof. It should be appreciated that the height and width of first upper edge 142 and the second upper edge 144 that substantially form the first seal 146 can be adjusted to include enough surface area to punch one or more holes or hooks for hanging container 100 (e.g., on a display post in a store), and may take any shape.

Lower edge 136 is configured to be one continuous edge arranged to wrap around the entire perimeter surface 118 and seal to the perimeter surface 118 of base 102, substantially forming a second seal 148 along the surface area below the horizontal dashed line proximate lower edge 136 in FIG. 6A. Second seal 148 is established between this surface area and perimeter surface 118 of base 102 via one or more sealing techniques, e.g., heat sealing, conduction sealing, induction sealing, adhesive sealing, ultrasonic bonding, welding, laser sealing or any combination thereof. Lower edge 136 is intended to cover the entire width and length of each side face of perimeter surface 118 such that, when sealed to base 102, lower edge 136 is substantially coincident with the lowest edge of base perimeter 114, i.e., the side of rim R, e.g., lower edge 136 and rim R simultaneously contact the planar surface on which container 100 is standing on. Therefore, in some examples, the container 100 stands on both rim R of base perimeter 114 and lower edge 136 of wall 104 simultaneously, increasing the structural stability of container 100 and increasing overall thickness of the portions of container 100 that the container stands on. It should be appreciated that additional layers of material can be provided along upper edge 134 and/or along lower edge 136 to add additional stiffness as necessary.

As shown in FIGS. 6A-6B, first end 138 of wall 104 includes a first vertical portion 150 and second end 140 of wall 104 includes a second vertical portion 152. These portions are "vertical" in that they are disposed along lines that are substantially orthogonal to the lower edge 136 and upper edge 134 such that, when container 100 is free-standing, e.g., on rim R, these portions will be disposed substantially vertically. Although not illustrated, it should be appreciated that these vertical sections do not need to be substantially orthogonal to the lower edge 136 and upper edge 134, and can be disposed at other angles deviated from orthogonal, e.g., 5 degrees, 10 degrees, 15 degrees, etc. After, or contemporaneously with, the creation of first seal 146 and second seal 148, first vertical portion 150 and second vertical portion 152 will overlap and are sealed together, e.g., third seal 154 (shown as a lap seal in FIG. 6B with second portion 152 beneath first portion 150 shown as dashed lines), substantially closing wall 104 around base 102 and completely forming and substantially closing off internal space 128. Third seal 154 is established between first vertical portion 150 and second vertical portion 152 via one or more sealing techniques, e.g., heat sealing, conduction sealing, induction sealing, adhesive sealing, ultrasonic bonding, welding, laser sealing or any combination thereof. Although illustrated as a lap seal substantially centered with respect to the side face illustrated in FIG. 6B, it should be appreciated that, in some examples, the lap seal can be disposed off-center, i.e., to the left or the right of the illustrated position. In those examples, i.e., where the third seal 154 is arranged off-center with respect to the illustrated side face of container 100, more surface area of outside surface 132 is available for printing or adhering labels without interference from the topographical variation caused by the overlapping seal created. In some examples, the third seal 154 (e.g., the lap seal shown), is disposed on one of the other side faces, i.e., a lateral side face 156 (shown in FIG. 3) rather than the larger side face illustrated in FIG. 6B as well as the complementary larger side face on the diametrically opposed side of container 100 (not shown).

Although not illustrated, it should be appreciated that third seal 154 can also be a butt-joint seal. For example, rather than first vertical portion 150 and second vertical portion 152 overlapping to form a lap seal, the edges of first vertical portion 150 and second vertical portion 152 can be placed in contact with each other, i.e., abutting each other, and one or more pieces of additional material can be affixed, secured, or sealed over first vertical portion 150 and second vertical portion 152, sealing them together. By having at least one piece of additional material sealed over the two vertical portions of wall 104, the space 128 can be completely sealed off. In some examples, two pieces of additional material can be used to seal the butt-joint, e.g., one piece on the inside surface of first vertical portion 150 and second vertical portion 152 and the other piece on the outside surface of first vertical portion 150 and second vertical portion 152. In some examples, the additional piece or additional pieces of material described herein can be a translucent, transparent, or opaque material, e.g., plastic, paper, or any of the other material types used to form wall 104.

It should be appreciated that, an imaginary plane (not shown) is formed parallel with lower base surface 110 of base 102, substantially dividing space 128 (holding foodstuffs or other products) from spout 120 and/or the rest of base 102. Therefore, above this imaginary plane, i.e., in the second direction DR2 opposite of first direction DR1, lies a substantial portion of wall 104, which, when completely sealed, encompasses space 128. Additionally, below this imaginary plane, lies a substantial portion of base 102 including base perimeter 104 and rim R. In some examples, the volume of air or empty space between the imaginary plane and a secondary plane coincident with rim R, i.e., first volume V1 (shown in FIG. 5), is approximately ⅕ of the volume within space 128, i.e., second volume V2 (also shown in FIG. 5). In some examples the ratio of the volume of this empty space between the imaginary plane and rim R to the volume of space 128 is selected from the range of 1:3-1:8. The empty space below the imaginary plane includes at least a portion of spout 120 such that when container 100 is free standing on rim R no portion of spout 120 or cap assembly 106 is in contact with the planer surface on which container 100 is standing. In other words, spout 120 and cap assembly 106 are sufficiently recessed past rim R in second direction DR2 such that no portion of spout 120 and cap assembly 106 touch or contact the surface the container is standing on. In some examples, cap assembly 106 fits within or is recessed within the first volume V1, i.e., the volume of empty space between the imaginary plane and the secondary plane coincident with rim R, such that no portion of cap assembly 106 contacts or interferes with the planer surface that rim R contacts while container 100 is standing.

In one exemplary embodiment, a container 100 according to the present disclosure is manufactured and formed based in accordance with the following example. A first material sheet stock of a first thickness T1 is produced as either a plurality of pre-cut portions or a continuous sheet of material. Each pre-cut portion, or the continuous sheet, is fed into a machine configured to handle a minimum of two material stocks that can include a mold and thermoforming (heated) die to form the shape of base 102 as described above. As discussed, the shape of the lower base surface 110 and the upper base surface 112 form a shape of a rectellipse or a squircle. The base 102 is formed with a base perimeter 114 extending in a first direction DR1 (downward in FIGS. 2A and 2B) and away from lower base surface 110. The base 102 is also formed by punching a hole, e.g., aperture 116, and sealing into place a diaphragm vale 108 inside a spout 120, where valve 108 will release and dispense the material and/or foodstuffs contained within the completed container 100 when under pressure (discussed below). A second sheet of sheet stock material of a second thickness T2 (where second thickness T2 is less than or equal to first thickness T1) is produced as a plurality of pre-cut portions or one continuous sheet of material. Each pre-cut portion, or the continuous sheet, is formed or cut into the shape of wall 104, as shown in FIG. 6A, for example. Initially, the lower edge 136 of wall 104 is wrapped around the entire perimeter surface 118 and sealed against and to the perimeter surface 118 forming a seal (e.g., second seal 148 as discussed above). As the lower edge 136 of wall 104 is wrapped around the perimeter of base 102, first vertical portion 150 of first end 138 of wall 104 overlaps with second vertical portion 152 of second end 140 of wall 104. These two vertical portions are then sealed to each other forming another seal (e.g., third seal 154 as discussed above). At this point, a substantially cylindrical structure has been formed between the base and wall 104 with an open top, i.e., where there is an opening to space 128 proximate upper edge 134 of wall 104. At this point during manufacturing, the partially formed container 100 is sent to a separate filling unit (not shown) where a filling nozzle is inserted into the open top of container 100 (proximate upper edge 134) and one or more materials, e.g., liquids, semi-liquids, solids, or other foodstuffs are inserted into space 128. Once filled, in a final sealing operation, the first upper edge portion 142 and second upper edge portion 144 are sealed to each other, forming the last seal (e.g., first seal 146 as discussed above), closing space 128 and sealing in the material or other foodstuffs within container 100. When not in use, i.e., when not dispensing the material stored within space 128, container 100 is configured to stand with no additional support on a substantially planar surface along the rim of base perimeter 114. In this configuration, the depth of base perimeter 114 is configured such that cap assembly 106 does not contact the surface that container 100 is standing on. When a user desires to dispense the stored material, the user will flip or click open cap 124 such that spout 120 is exposed and the user can wrap their hand around outside surface 132 of wall 104, proximate upper edge 134, for example, and squeeze or apply a compressive force until the building internal pressure within the sealed container exceeds the threshold pressure to open the valve 108 and dispense the material from the spout 120. When the user is done dispensing the desired amount of material, the user can flip or click closed cap 124 against cap base 122. It should be appreciated that, as the wall 104 that forms a substantial portion of the body of container 100 can be made of flexible materials, e.g., paper or plastics, other interactions with container 100 besides simply squeezing the outside of wall 104 can cause a sufficient increase in internal pressure to dispense the foodstuffs and other products stored in space 128. For example, a user may bend, twist, or roll, a portion of wall 104 in first direction DR1 such that it folds onto itself to increase internal pressure and dispense foodstuffs As an alternative to the formation steps described above, it should be appreciated that the wall sheet stock can be profile extruded in a pre-formed cylindrical shape, removing the need for the third seal 154. For example, a melt-processable material can be melted to a molten state and forced through a profile die to form a long cylindrical body. By using a cylindrical wall stock during the manufacturing process, the cylindrical stock is cut to the desired length (corresponding to the desired height of the container 100), the lower edge 136 of the cylindrical wall 104 is sealed about and against perimeter surface 118 (e.g., second seal 148 as discussed above), the space above base 102 is filled with the desired material, and then the first upper edge portion 142 to the second upper edge portion 144 are sealed together to completely seal container 100.

The foregoing design and method of manufacture of container 100 produces a container that is both aesthetically pleasing and keeps the cap 124 and/or spout 120 from touching the surface that container 100 is standing on when not in use. This design advantageously conceals or hides the cap assembly 106 from the user's view and allows for one or more large, clean, surfaces on which to add advertising material without obstruction in comparison to packages or bottles of similar size.

Figure 7:
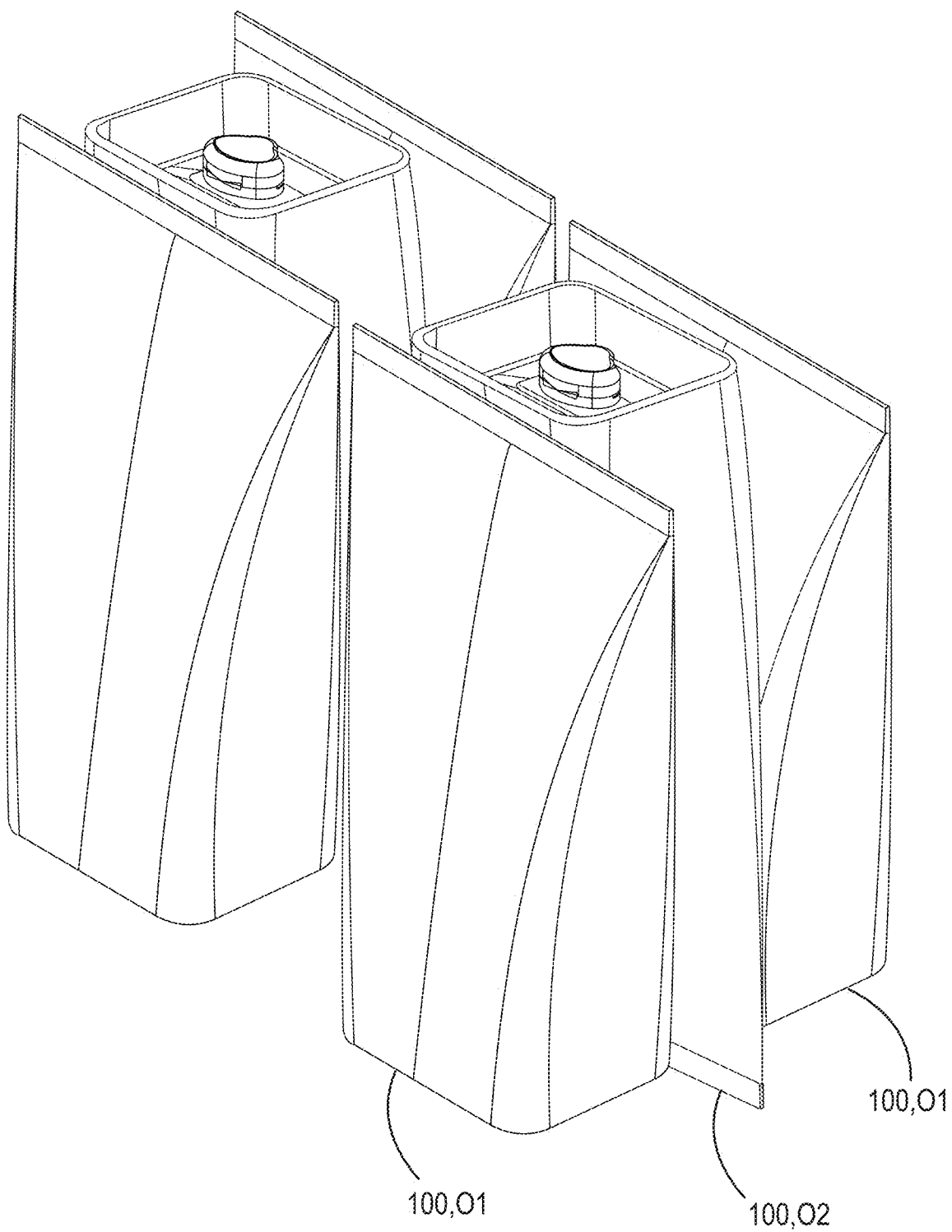
FIG. 7 is a top perspective view of a secondary packaging configuration of containers according to the present disclosure.

Additionally, the design set forth above allows for higher packing efficiency of a plurality of containers 100. For example, as shown in FIG. 7, an alternating pattern of containers 100, e.g., where one or more containers are oriented in a first orientation O1 and one or more containers are oriented in a second orientation O2 (where the second orientation O2 corresponds with a container 100 that has been rotated 180 degrees along a line passing through both lateral surfaces 156 as shown in FIG. 3), results in increased packing efficiency when compared to typical container designs, e.g., yogurt containers. The alternating pattern of containers 100 can be achieved by the use of a secondary packaging unit (not shown) capable of receiving sealed containers and placing them within a box or tray for shipping in the orientations shown in FIG. 7.

Figure 8A:
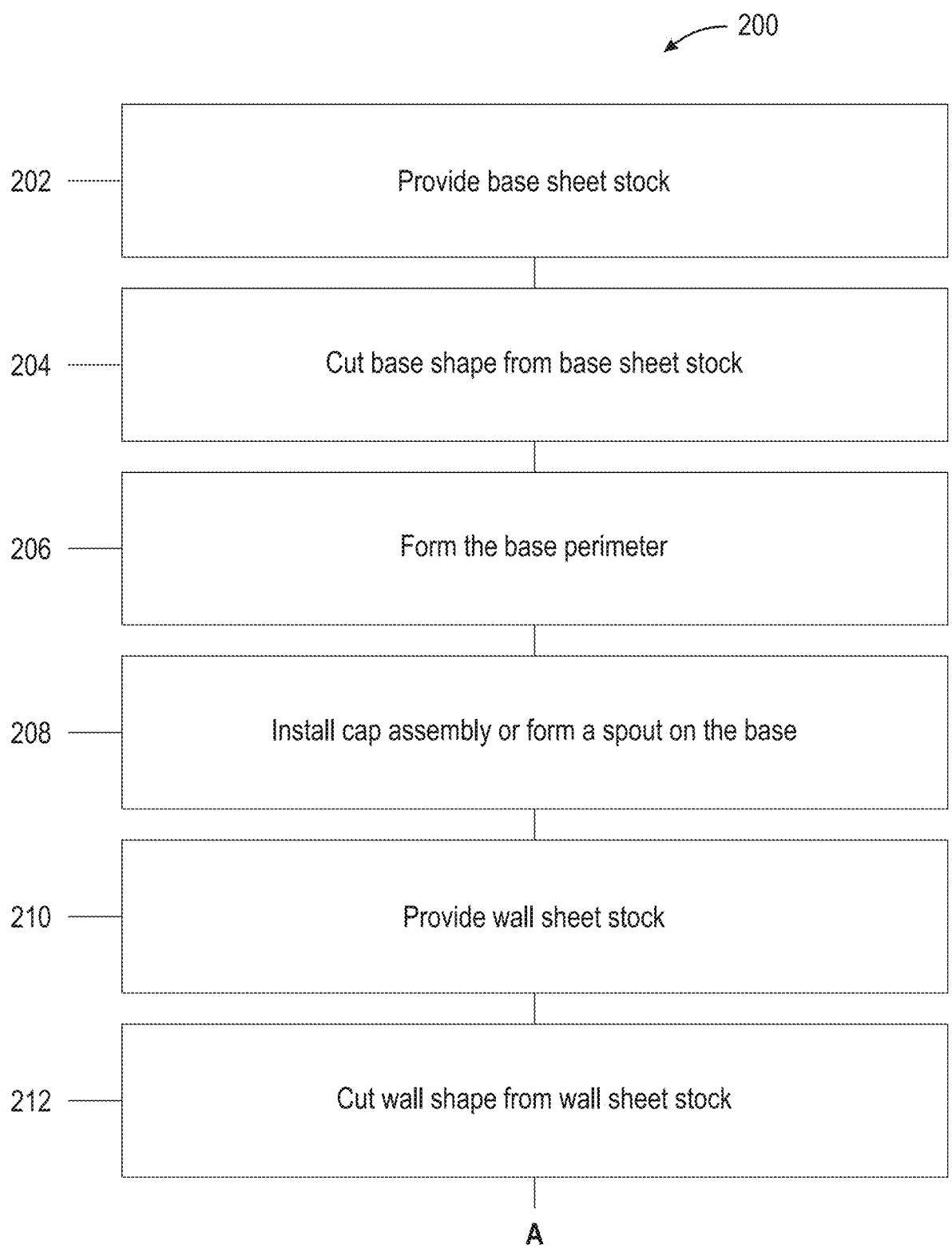
FIGS. 8A-8B illustrate a flow chart of the steps of a method according to the present disclosure.
Figure 8B:
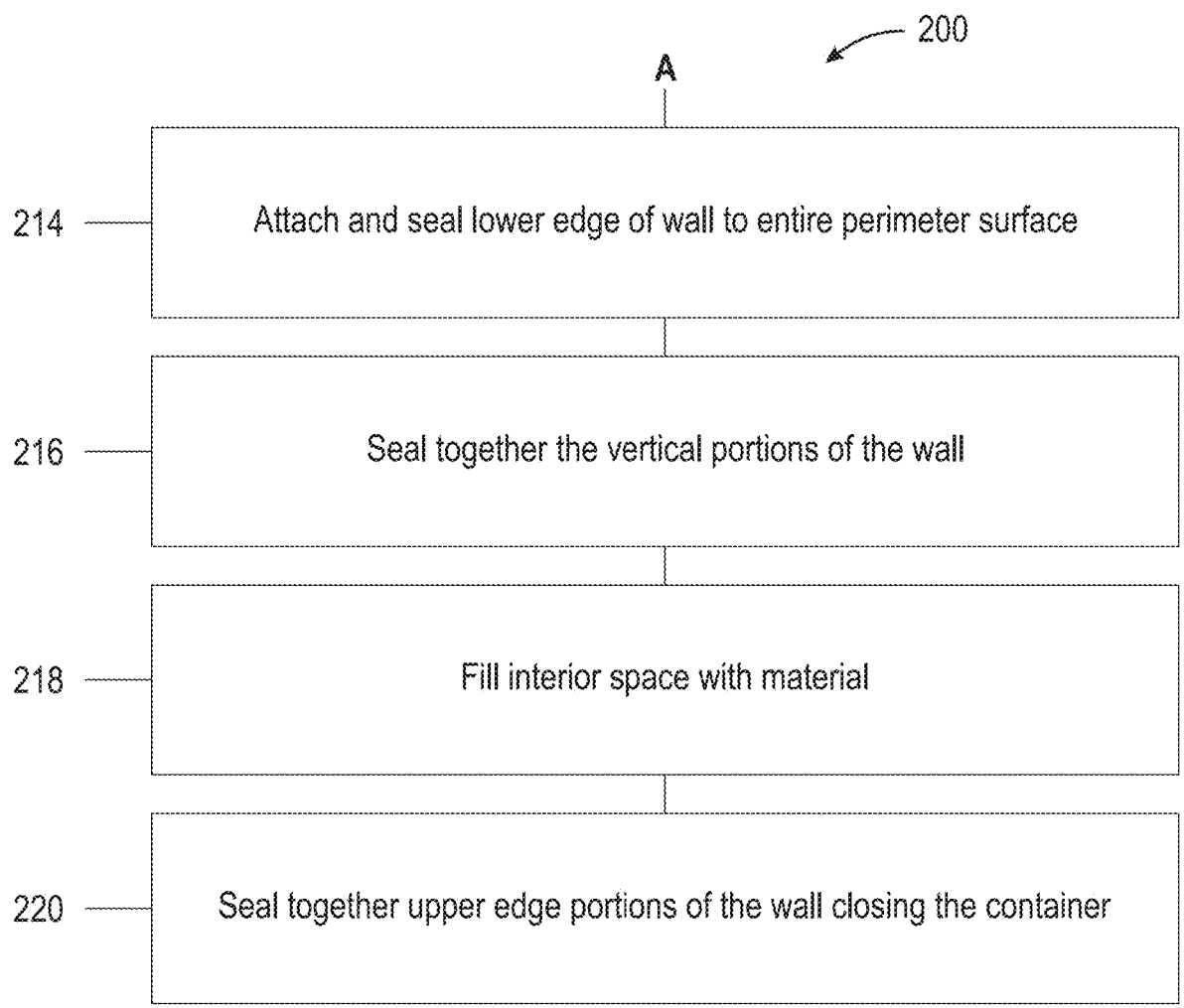

FIGS. 8A-8B include a flow chart illustrating one exemplary method 200 of manufacturing a container 100 according to the present disclosure. As shown, method 200 can include, for example: providing a base sheet stock of a first thickness to act as a base for the container (step 202); cutting a base shape from the base sheet stock (step 204); forming the base by forming a base perimeter having a perimeter surface (206); installing a cap assembly or forming a spout on the base (208); providing a wall sheet stock of a second thickness to act as a wall (step 210); cutting a wall shape from the wall sheet stock (step 212); attaching and sealing a lower edge of the wall shape about the entire perimeter surface of the base (step 214); forming the container having an interior space bounded by the base and the wall that is open at an upper edge, opposite the lower edge, by sealing together a first vertical portion and a second vertical portion of the wall (step 216); filling the interior space with a material (218); and sealing a first upper edge portion with a second upper edge portion of the wall, thereby closing the container (step 220).

Figure 9A:
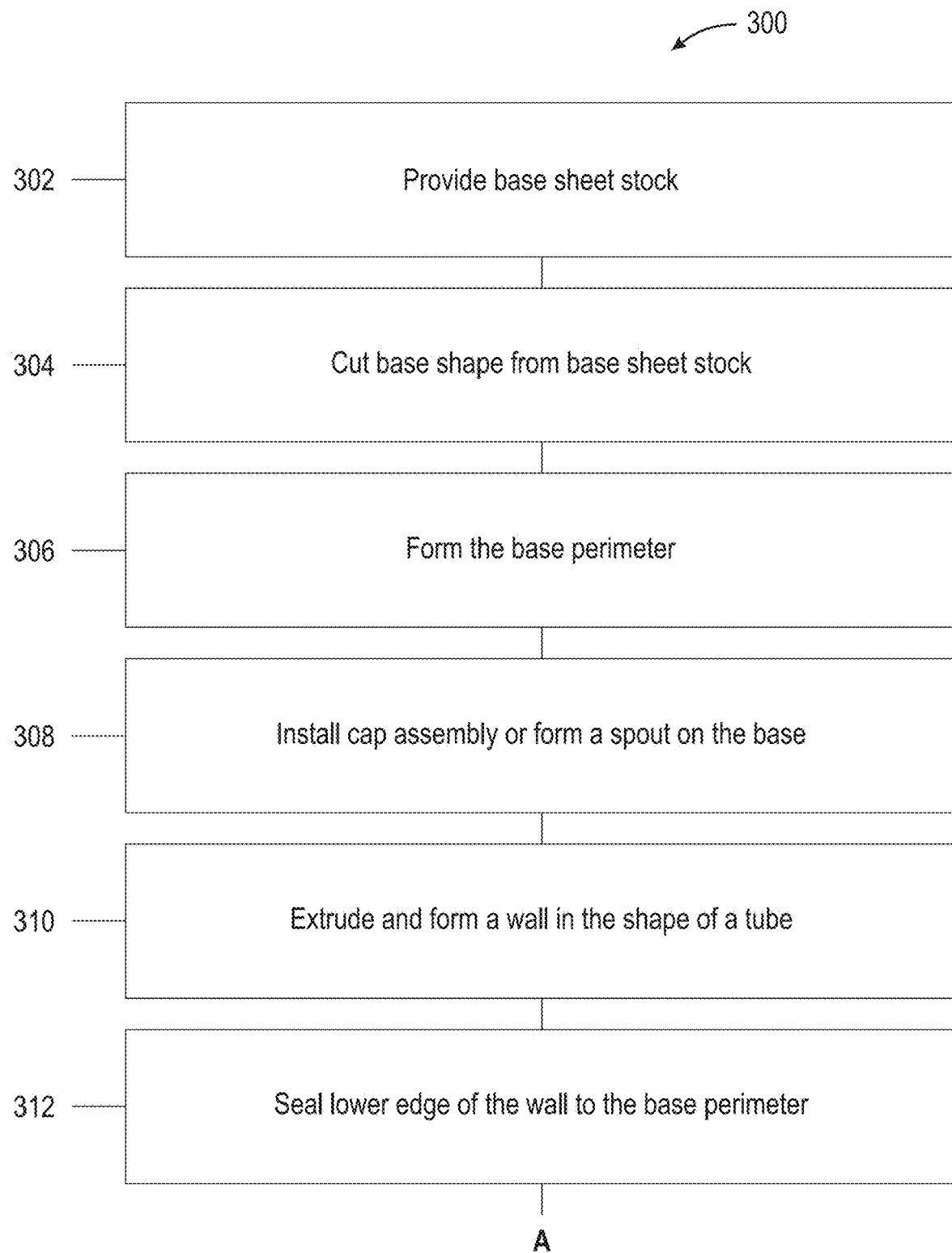
FIGS. 9A-9B illustrate a flow chart of the steps of a method according to the present disclosure.
Figure 9B:
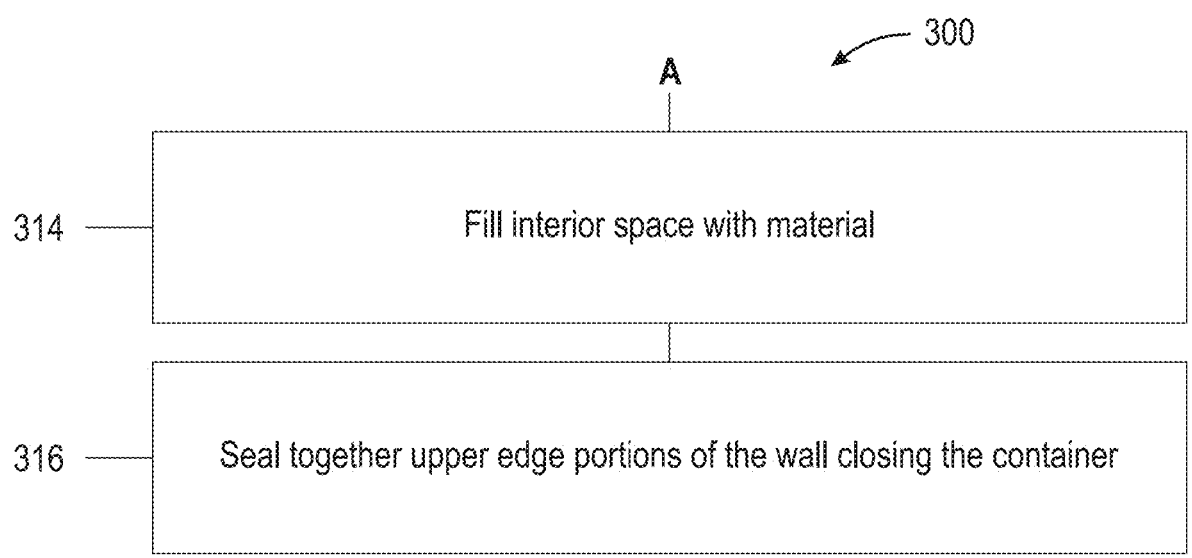

FIGS. 9A-9B include a flow chart illustrating another exemplary method 300 of manufacturing a container 100 according to the present disclosure. As shown, method 300 can include, for example: providing a base sheet stock of a first thickness to act as a base for the container (step 302); cutting a base shape from the base sheet stock (step 304); forming the base by forming a base perimeter having a perimeter surface (step 306); installing a cap assembly or forming a spout on the base (step 308); extruding and cutting a wall in the form of a cylinder (step 310); sealing a lower edge of the wall to the perimeter surface of the base forming an interior space (step 312); filling the interior space with a material (step 314); and sealing a first upper edge portion with a second upper edge portion of the wall, thereby closing the container (step 316).

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A container for storing and dispensing foodstuffs, the container comprising:
   a base comprising an aperture for dispensing the foodstuffs and a base perimeter, the base perimeter having a perimeter surface, wherein the base further comprises a lower base surface having an imaginary major axis and an imaginary minor axis, where the imaginary major axis is longer than the imaginary minor axis; and
   a wall having an upper edge and a lower edge, the upper edge comprising a first upper edge portion and a second upper edge portion;
   wherein the lower edge of the wall is affixed about the entire perimeter surface of the base forming a lower seal, and the first upper edge portion is affixed to the second upper edge portion forming an upper seal, thereby forming a space to hold the foodstuffs, wherein the upper seal is oriented parallel to the lower seal.

2. The container of claim 1, wherein the wall comprises a first vertical portion arranged orthogonal to the imaginary major axis and the imaginary minor axis of the base, and a second vertical portion arranged orthogonal to the imaginary major axis and the imaginary minor axis of the base, and wherein the first vertical portion and the second vertical portion of the wall are affixed to each other.

3. The container of claim 1, wherein the base comprises a lower base surface and the lower base surface is formed as a circle, a square, a rounded rectangle, a squircle, or a rectellipse.

4. The container of claim 1, wherein the base comprises a lower base surface and the lower base surface comprises an aperture communicably coupled with the space.

5. The container of claim 4, wherein the aperture is formed as an integral valve or configured to receive a valve insert.

6. The container of claim 4, wherein the base perimeter terminates at a rim, the rim configured to uniformly contact a planar surface to support the container.

7. The container of claim 1, wherein the wall and the base are made of paper, polypropylene, polyethylene, polyethylene terephthalate, polyamide, polystyrene, polylactic acid, thermoplastic starch, Polyhydroxyalkanoate, Polyhydroxybutyrate, Polybutylene succinate, or any combination thereof.

8. The container of claim 1, wherein a first volume between a lower base surface of the base and a plane coincident with a rim of the base is less than a second volume of the space to hold the foodstuffs.

9. The container of claim 1, further comprising a cap assembly comprising a hinge, wherein the entire cap assembly is disposed within a first volume between a lower base surface of the base and a plane coincident with a rim of the base.

10. The container of claim 1, wherein the wall has a thickness and the thickness is selected from a range between 10-1500 microns.

11. A method of manufacturing a container, the method comprising:
    forming a base, the base comprising an aperture for dispensing foodstuffs and a base perimeter, the base perimeter having a perimeter surface, wherein the base further comprises a lower base surface having an imaginary major axis and an imaginary minor axis, where the imaginary major axis is longer than the imaginary minor axis;
    forming a wall having an upper edge and a lower edge, the upper edge comprising a first upper edge portion and a second upper edge portion;
    sealing the lower edge of the wall about the entire perimeter surface of the base to form a lower seal; and
    sealing the first upper edge portion to the second upper edge portion to form an upper seal, thereby forming a space, wherein the upper seal is oriented parallel to the lower seal.

12. The method of claim 11, wherein the wall is formed with a first vertical portion and a second vertical portion, the method further comprising:
    sealing the first vertical portion and the second vertical portion.

13. The method of claim 11, wherein the base comprises a lower base surface, the lower base surface being formed as a circle, a square, a squircle, or a rectellipse.

14. The method of claim 11, wherein the base comprises a lower base surface, the lower base surface comprising an aperture communicably coupled with the space.

15. The method of claim 14, wherein the aperture is formed as an integral valve or is configured to receive a valve insert.

16. The method of claim 14, wherein a first volume between the lower base surface of the base and a plane coincident with a rim of the base is less than a second volume of the space to hold the foodstuffs.

17. The method of claim 11, wherein the base is formed with a cap assembly comprising a hinge, wherein the entire cap assembly is disposed within a first volume between a lower base surface of the base and a plane coincident with a rim of the base.

18. The method of claim 11, wherein the wall and the base are formed of polypropylene, polyethylene, polyethylene terephthalate, polyamide, polystyrene, polylactic acid, paper, thermoplastic starch, Polyhydroxyalkanoate, Polyhydroxybutyrate, Polybutylene succinate, or any combination thereof.

19. The method of claim 11, wherein the sealing of the lower edge of the wall about the entire perimeter surface of the base and the sealing of the first upper edge portion to the second upper edge portion use heat sealing, conduction sealing, induction sealing, adhesive sealing, ultrasonic bonding, welding, laser sealing or any combination thereof.

20. A container for storing and dispensing foodstuffs, the container comprising:
    a base comprising an aperture for dispensing the foodstuffs and a base perimeter, the base perimeter having a perimeter surface; and
    a wall having an upper edge and a lower edge, the upper edge comprising a first upper edge portion and a second upper edge portion;
    wherein the lower edge of the wall is affixed about the entire perimeter surface of the base forming a lower seal, and the first upper edge portion is affixed to the second upper edge portion forming an upper seal, thereby forming a space to hold the foodstuffs, wherein the upper seal is oriented parallel to the lower seal;
    wherein the base comprises a lower base surface and the lower base surface comprises an aperture communicably coupled with the space;
    wherein the base perimeter terminates at a rim, the rim configured to uniformly contact a planar surface to support the container.

21. A container for storing and dispensing foodstuffs, the container comprising:
    a base comprising an aperture for dispensing the foodstuffs and a base perimeter, the base perimeter having a perimeter surface; and
    a wall having an upper edge and a lower edge, the upper edge comprising a first upper edge portion and a second upper edge portion;
    wherein the lower edge of the wall is affixed about the entire perimeter surface of the base forming a lower seal, and the first upper edge portion is affixed to the second upper edge portion forming an upper seal, thereby forming a space to hold the foodstuffs, wherein the upper seal is oriented parallel to the lower seal;
    wherein a first volume between a lower base surface of the base and a plane coincident with a rim of the base is less than a second volume of the space to hold the foodstuffs.

22. A container for storing and dispensing foodstuffs, the container comprising:
    a base comprising an aperture for dispensing the foodstuffs and a base perimeter, the base perimeter having a perimeter surface;
    a wall having an upper edge and a lower edge, the upper edge comprising a first upper edge portion and a second upper edge portion; and
    a cap assembly comprising a hinge, wherein the entire cap assembly is disposed within a first volume between a lower base surface of the base and a plane coincident with a rim of the base;
    wherein the lower edge of the wall is affixed about the entire perimeter surface of the base forming a lower seal, and the first upper edge portion is affixed to the second upper edge portion forming an upper seal, thereby forming a space to hold the foodstuffs, wherein the upper seal is oriented parallel to the lower seal.

23. A method of manufacturing a container, the method comprising:
    forming a base, the base comprising an aperture for dispensing foodstuffs and a base perimeter, the base perimeter having a perimeter surface;
    forming a wall having an upper edge and a lower edge, the upper edge comprising a first upper edge portion and a second upper edge portion;
    sealing the lower edge of the wall about the entire perimeter surface of the base to form a lower seal; and sealing the first upper edge portion to the second upper edge portion to form an upper seal, thereby forming a space, wherein the upper seal is oriented parallel to the lower seal;

wherein the base comprises a lower base surface and the lower base surface comprises an aperture communicably coupled with the space; and wherein the base perimeter terminates at a rim, the rim configured to uniformly contact a planar surface to support the container.

24. A method of manufacturing a container, the method comprising:

forming a base, the base comprising an aperture for dispensing foodstuffs and a base perimeter, the base perimeter having a perimeter surface;

forming a wall having an upper edge and a lower edge, the upper edge comprising a first upper edge portion and a second upper edge portion;

sealing the lower edge of the wall about the entire perimeter surface of the base to form a lower seal; and sealing the first upper edge portion to the second upper edge portion to form an upper seal, thereby forming a space, wherein the upper seal is oriented parallel to the lower seal;

wherein the base comprises a lower base surface, the lower base surface comprising an aperture communicably coupled with the space;

wherein a first volume between a lower base surface of the base and a plane coincident with a rim of the base is less than a second volume of the space to hold the foodstuffs.

25. A method of manufacturing a container, the method comprising:

forming a base, the base comprising an aperture for dispensing foodstuffs and a base perimeter, the base perimeter having a perimeter surface;

forming a wall having an upper edge and a lower edge, the upper edge comprising a first upper edge portion and a second upper edge portion;

forming a cap assembly comprising a hinge, wherein the entire cap assembly is disposed within a first volume between a lower base surface of the base and a plane coincident with a rim of the base;

sealing the lower edge of the wall about the entire perimeter surface of the base to form a lower seal; and sealing the first upper edge portion to the second upper edge portion to form an upper seal, thereby forming a space, wherein the upper seal is oriented parallel to the lower seal.

* * * * *